US008528968B2

(12) United States Patent
Moulton et al.

(10) Patent No.: US 8,528,968 B2
(45) Date of Patent: Sep. 10, 2013

(54) STOWABLE PASSENGER SEAT TRAY TABLE

(75) Inventors: Kristopher C. Moulton, Tucson, AZ (US); Nathanael M. Curley, Tucson, AZ (US); Michael H. Smith, Tucson, AZ (US)

(73) Assignee: BE Aerospace, Inc., Wellington, FL (US)

( * ) Notice: Subject to any disclaimer, the term of this patent is extended or adjusted under 35 U.S.C. 154(b) by 378 days.

(21) Appl. No.: 12/956,672

(22) Filed: Nov. 30, 2010

(65) Prior Publication Data

US 2012/0133180 A1 May 31, 2012

(51) Int. Cl.
A47B 83/02 (2006.01)
(52) U.S. Cl.
USPC .......................................... 297/147
(58) Field of Classification Search
USPC ................ 297/150, 144, 145, 146, 147, 170, 297/157.1; 108/50.11
See application file for complete search history.

(56) References Cited

U.S. PATENT DOCUMENTS

| | | | |
|---|---|---|---|
| 4,852,940 A | 8/1989 | Kanigowski | |
| 4,944,552 A | 7/1990 | Harris | |
| 5,169,209 A | 12/1992 | Beroth | |
| 5,269,229 A | 12/1993 | Akapatangkul | |
| 5,547,247 A | 8/1996 | Dixon | |
| 6,431,645 B2 | 8/2002 | Massara et al. | |
| 6,454,349 B1 | 9/2002 | Konya | |
| 6,550,861 B1 | 4/2003 | Williamson | |
| 6,761,398 B2 | 7/2004 | Bentley et al. | |
| 6,792,875 B2 | 9/2004 | Williamson et al. | |
| 6,827,026 B2 | 12/2004 | Williamson et al. | |
| 7,004,430 B2 | 2/2006 | Weekly | |
| 7,073,449 B2 | 7/2006 | Pipkin | |
| 7,261,369 B2 | 8/2007 | Ahad | |
| 7,311,354 B2 * | 12/2007 | Giasson | 297/161 |
| 7,506,923 B1 | 3/2009 | Gauss | |
| 7,798,072 B2 * | 9/2010 | Becker et al. | 108/42 |
| 7,874,614 B2 * | 1/2011 | Figueras Mitjans | 297/145 |
| 2006/0220425 A1 | 10/2006 | Becker et al. | |
| 2007/0145791 A1 | 6/2007 | Strasser | |
| 2008/0092784 A1 | 4/2008 | Merensky | |

FOREIGN PATENT DOCUMENTS

| | | |
|---|---|---|
| EP | 1160125 A2 | 5/2001 |
| EP | 1160125 A3 | 5/2001 |
| EP | 1801008 A2 | 6/2007 |
| WO | 2006030228 A1 | 3/2006 |

OTHER PUBLICATIONS

International Search Report for Application No. PCT/US2008/060046, Dated Mar. 9, 2009.
International Search Report for PCT/US2011/061366 mailed Mar. 30, 2012.

* cited by examiner

Primary Examiner — Milton Nelson, Jr.
(74) Attorney, Agent, or Firm — Shumaker, Loop & Kendrick, LLP

(57) ABSTRACT

A stowable tray table assembly including a tray table, an arm assembly supporting the tray table, and a frame comprising a vertical guide rail and a horizontal guide rail separately and consecutively guiding movement of the arm assembly, the arm assembly engaging the vertical guide rail when the tray table is in a vertical position and engaging the horizontal guide rail when the tray table is in a horizontal position.

17 Claims, 19 Drawing Sheets

STOWABLE PASSENGER SEAT TRAY TABLE

TECHNICAL FIELD AND BACKGROUND OF THE INVENTION

1. Field of the Invention

The present invention relates generally to the field of passenger seat tray tables, and more particularly, to a stowable tray table supported by an arm assembly guided along a frame and configured to slide in fore and aft directions when deployed along a guide rail positioned adjacent a passenger seat.

2. Background of the Invention

Various types of passenger seat tray tables are known including seat back-mounted tray tables that pivot into an operative position, tray tables that deploy from within an armrest by way of a complex hinge, and portable tray tables that are removable from a docking station, among others. While several of these types of tray tables offer adjustability in terms of height, working surface area, and orientation with respect to their user, the conventional designs fail to provide a supporting arm assembly configured to translate the table top in fore and aft directions such that the tray table can remain usable while being moved a significant distance from the passenger to facilitate egress/ingress into and from the seat, or merely provide the passenger with increased free space.

Accordingly, it would be desirable to provide a tray table assembly configured to move between a stowed configuration and a deployed configuration, as well as configured such that the arm assembly supporting the tray table is movable relative to the passenger in a manner that maintains the tray table in a usable position.

BRIEF SUMMARY OF THE INVENTION

To achieve the foregoing, in one embodiment a stowable tray table assembly is provided herein including a tray table, an arm assembly supporting the tray table, and a frame comprising a vertical guide rail and a horizontal guide rail separately guiding movement of the arm assembly, the arm assembly engaging the vertical guide rail when the tray table is in a vertical position and engaging the horizontal guide rail when the tray table is in a horizontal position.

In a further embodiment, the tray table assembly includes a lift bracket vertically slidable along the frame and engaging the arm assembly when the arm assembly is engaged with the vertical guide rail to apply a lifting force to the arm assembly.

In a further embodiment, the tray table assembly includes a rotatable reel associated with the frame and maintaining a tensioned cable connected to the lift bracket for providing a lifting force to the lifting bracket to counterbalance the weight of the tray table.

In a further embodiment, the vertical guide rail defines a first end positioned apart from the horizontal guide rail and a second end positioned adjacent to the horizontal guide rail, wherein the arm assembly is disengaged from the lift bracket when the arm assembly is positioned at the second end of the vertical guide rail.

In a further embodiment, the horizontal guide rail defines a first end positioned adjacent to the vertical guide rail and a second end positioned apart from the vertical guide rail, wherein the tray table can only be moved to the vertical position when the arm assembly is positioned at the first end of the horizontal guide rail.

In a further embodiment, the horizontal guide rail defines a notch for clearing the arm assembly when the arm assembly is positioned at the first end of the horizontal guide rail.

In a further embodiment, the tray table assembly includes a carriage slidably carried on a bar positioned parallel to the horizontal guide rail, wherein the carriage supports the arm assembly when the tray table is in the horizontal position.

In a further embodiment, the arm assembly includes a first roller for engaging the vertical guide rail, and at least one second roller for engaging the horizontal guide rail, wherein the first roller defines a rotational axis perpendicular to a rotational axis defined by the at least one second roller.

In a further embodiment, the first roller and the at least one second roller are rotatably carried on a guided end of the arm assembly.

In a further embodiment, the tray table is movable relative to the arm assembly in a direction away from the frame when the tray table is in the horizontal position.

In a further embodiment, the horizontal guide rail is oriented perpendicular to the vertical guide rail.

In a further embodiment, the tray table assembly includes a cover attached to the frame that opens to provide access to an interior of the frame and the tray table in the stowed configuration.

According to another embodiment of the invention, a passenger seating arrangement is provided including a passenger seat and a tray table assembly. The tray table assembly includes a tray table, a supporting arm assembly, and a frame positioned alongside the passenger seat, the frame including a vertical guide rail and a horizontal guide rail independently guiding movement of the arm assembly, and the arm assembly engaging the vertical guide rail when the tray table is in a vertical position and engaging the horizontal guide rail when the tray table is in a horizontal position.

Additional features and advantages of the invention will be set forth in the detailed description which follows, and in part will be readily apparent to those skilled in the art from that description or recognized by practicing the invention as described herein.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

As used herein, the terms 'horizontal' and 'vertical' used in conjunction with the positions and orientations of the tray table, guide rails and other components of the tray table assembly are defined with reference to the floor of the passenger seating surface of the aircraft, which is envisioned to change with respect to gravitational horizontal during flight. As used herein, the terms 'fore' and 'aft' used in conjunction with tray table assembly component positions are defined with reference to a forward facing passenger seat such that 'fore' is defined as the direction away from the seat (i.e. towards the cockpit of the aircraft) and 'aft' is defined as the direction toward the seat (i.e. the tail of the aircraft). It is envisioned that directions with respect to the conveyance may change based on the orientation of the seat or other furniture within the conveyance.

Figure 1:
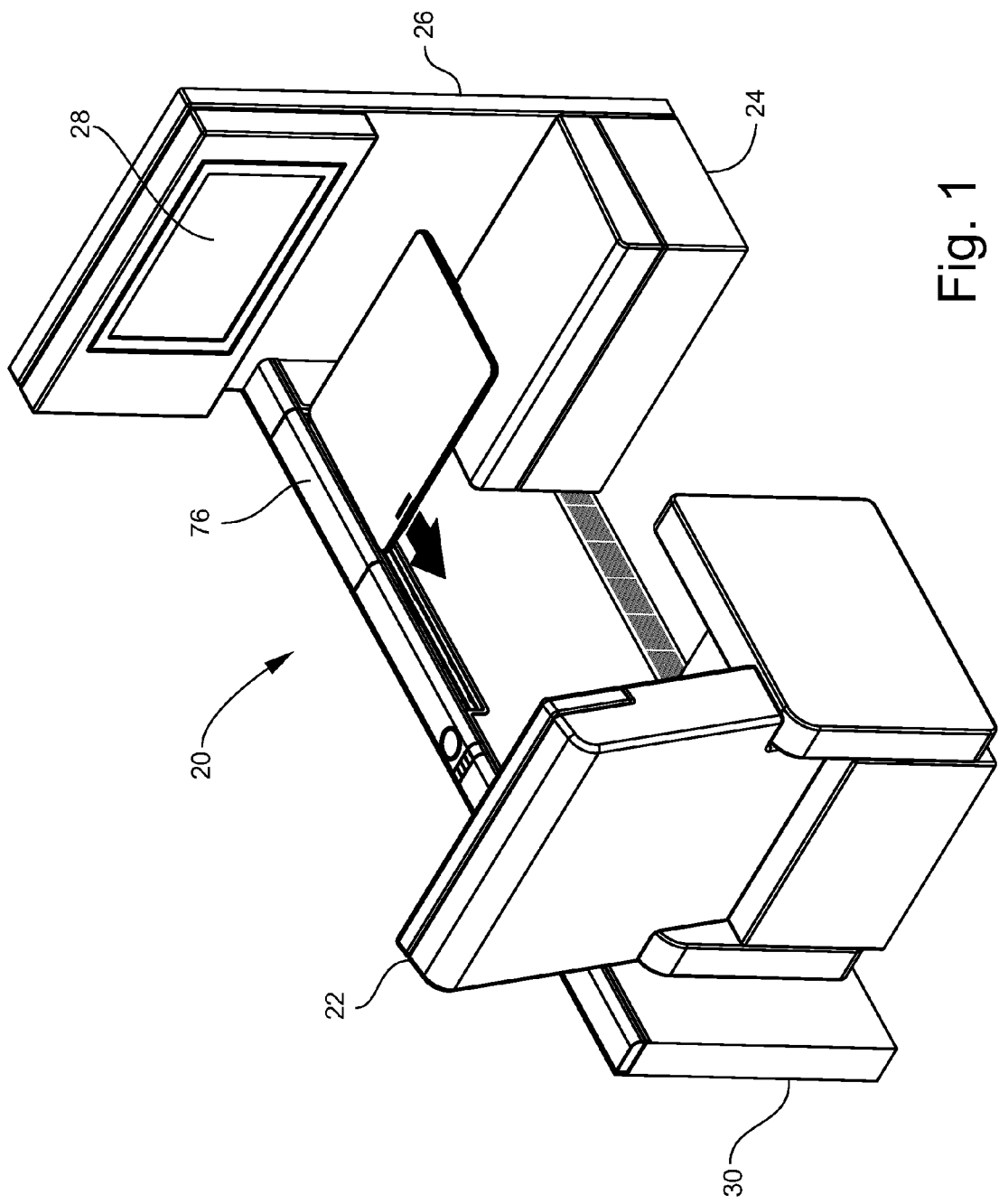
FIG. 1 is a perspective view of a passenger seat arrangement including a stowable tray table associated with the seat and configured to slide in fore and aft directions.
Figure 2:
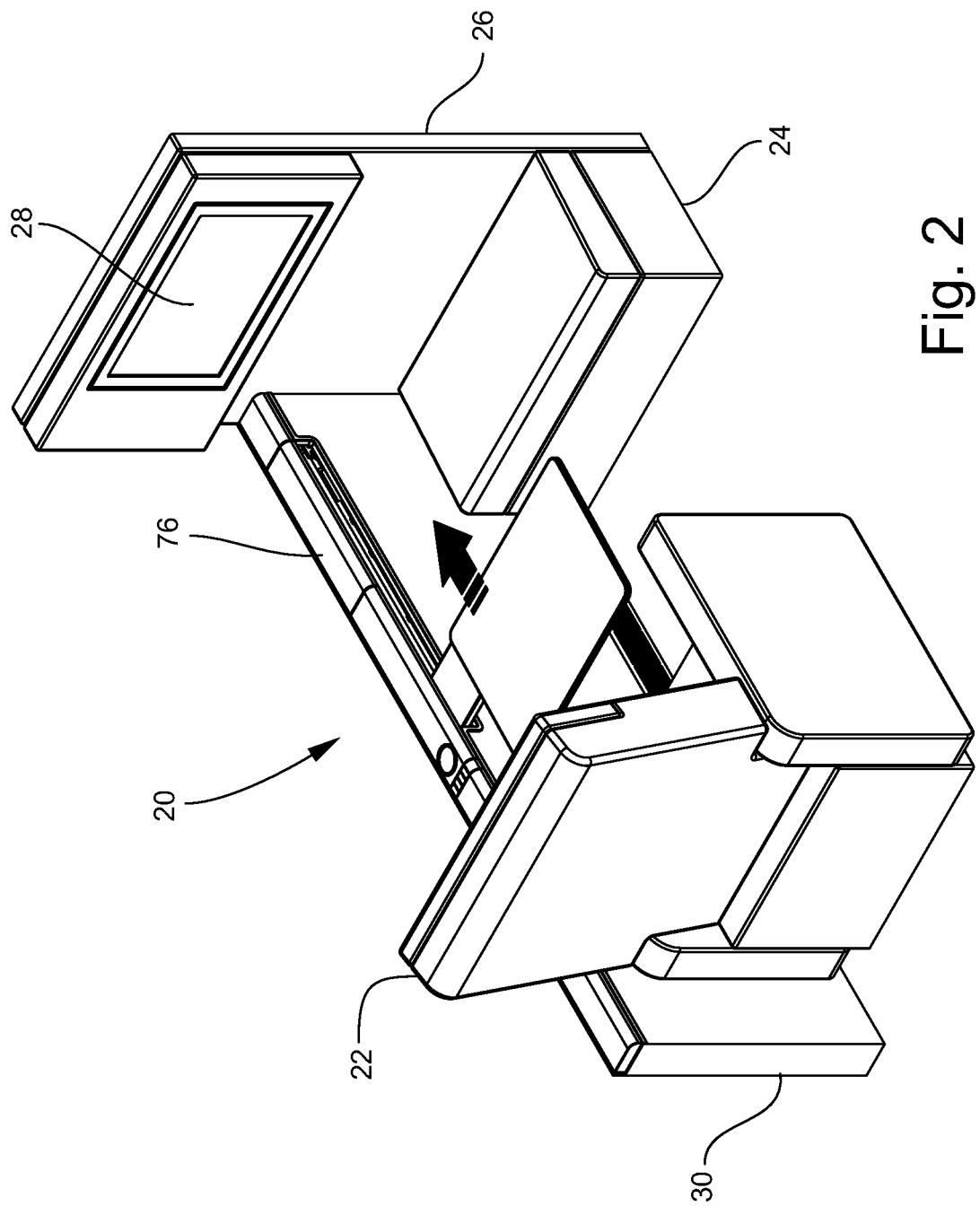
FIG. 2 is a perspective view of a passenger seat arrangement showing the tray table deployed and positioned proximate the seat.
Figure 3:
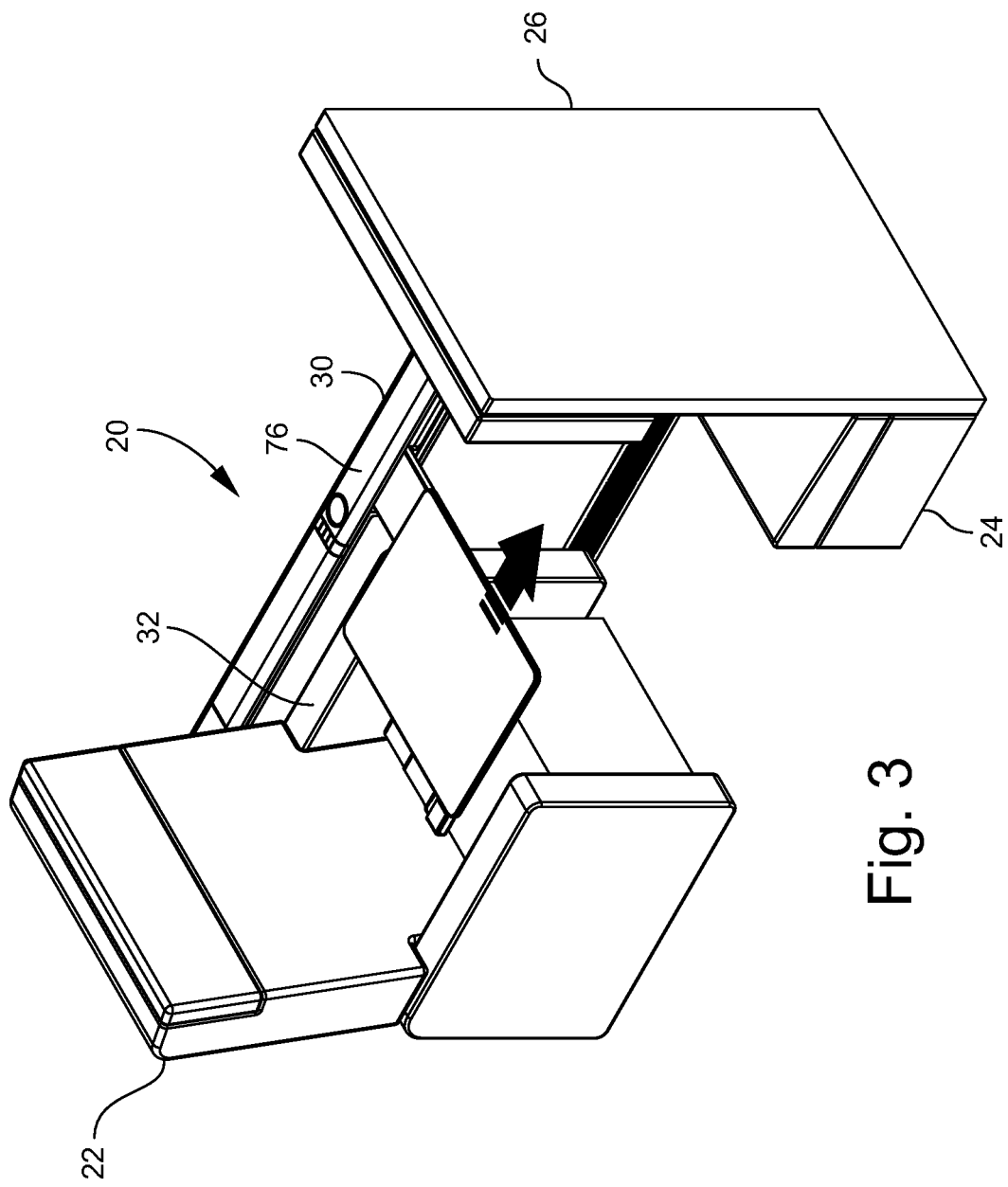
FIG. 3 is a perspective view of a passenger seat arrangement showing the tray table deployed and positioned proximate the seat.

Referring to FIGS. 1-3 a tray table assembly associated with a premium class seating arrangement is shown generally at reference numeral 20. The seating arrangement generally includes seat 22 configured to move between upright and reclined seating positions, ottoman 24 positioned fore of seat 22, partition 26 carrying monitor 28, and console 30 positioned alongside seat 22, and in the specific embodiment shown, spanning the distance from seat 22 to partition 26. Although seat 22 is shown having dedicated armrest 32 (see FIG. 3), it is envisioned that the function of armrest 32 may be incorporated into console 30. Thus, tray table assembly 20 may stow in either console 30 or within an armrest.

As described in detail below, tray table assembly 20 is configured to deploy to an operative position in which the tray table, or 'table top', of the assembly is in a horizontal position to provide a horizontal working surface. The tray table is configured to slide in fore and aft directions only after being deployed to the horizontal position to move the tray table toward and apart from the seat all the while keeping the tray table operative. Referring specifically to FIG. 1, the tray table is shown deployed and positioned apart from seat 22, with the directional arrow indicating the potential movement of the tray table toward seat 22. Referring specifically to FIGS. 2-3, the tray table is shown deployed and positioned adjacent seat 22, with the directional arrow indicating the potential movement of the tray table toward ottoman 24. As described in detail below, the tray table may only be moved from the horizontal position to the vertical position when positioned at the fore or fully forward position, thus apart from seat 22.

Figure 4:
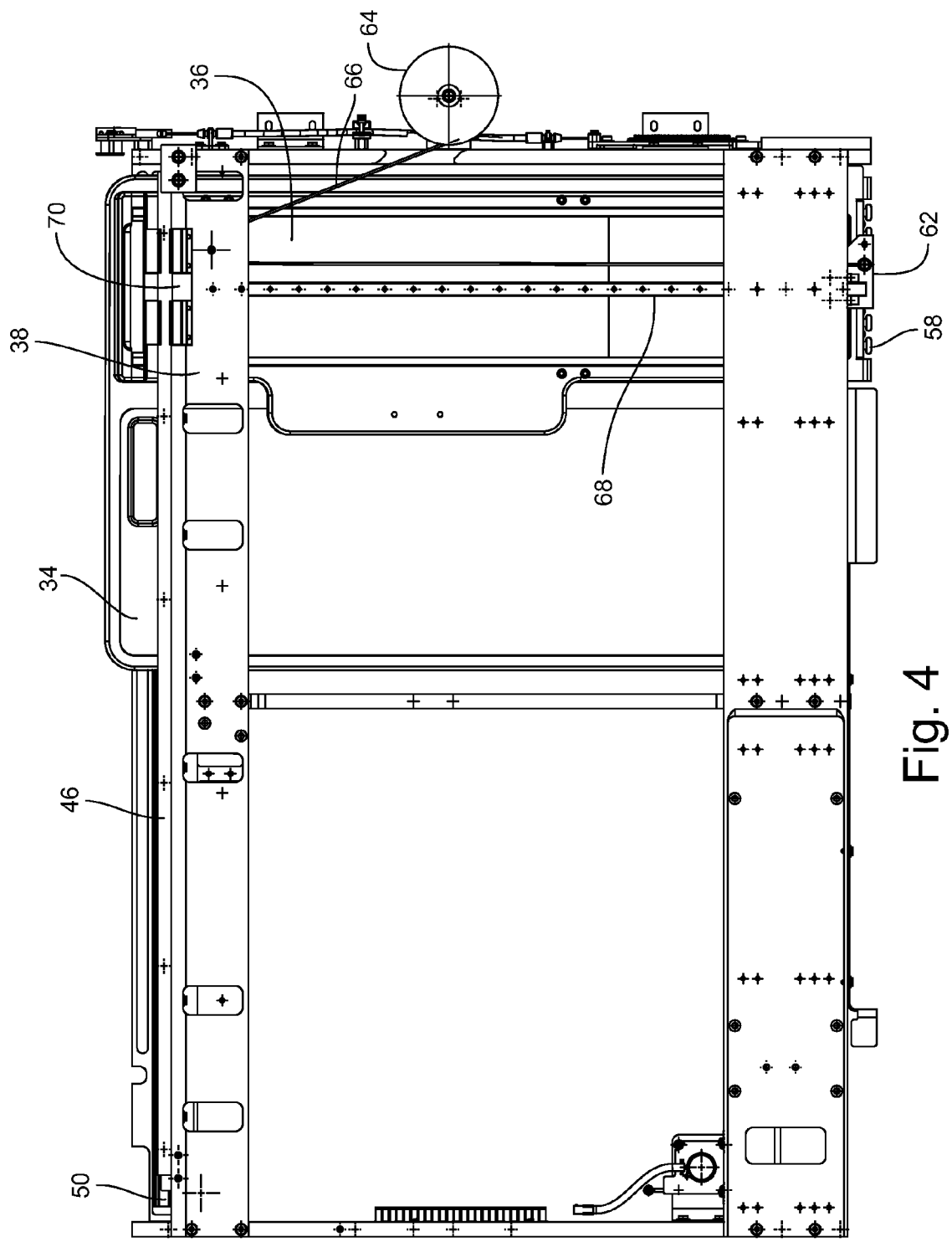
FIG. 4 is a side elevation view of the tray table frame and the tray table stowed.
Figure 5:
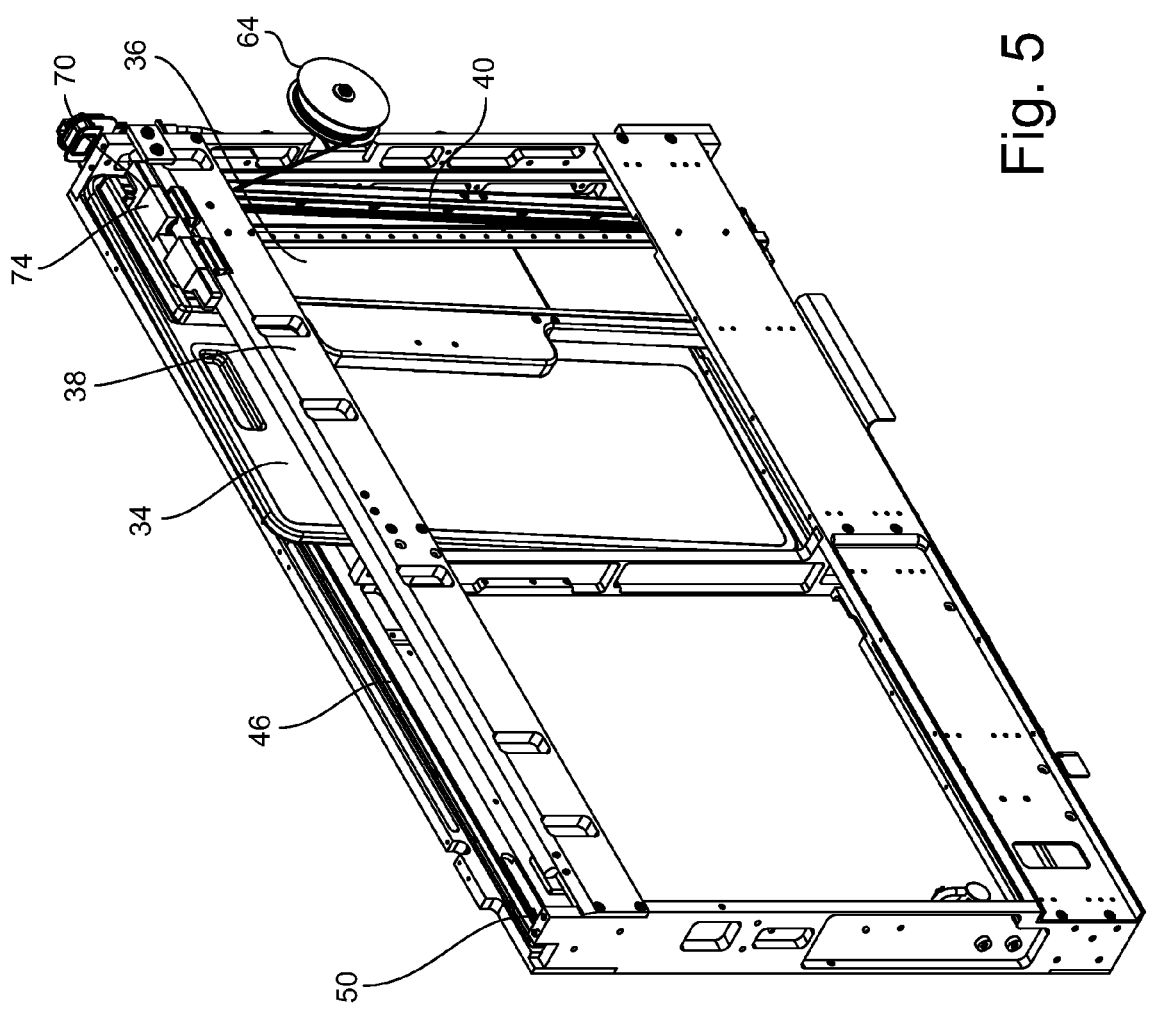
FIG. 5 is a perspective view of the tray table frame and the tray table stowed.
Figure 6:
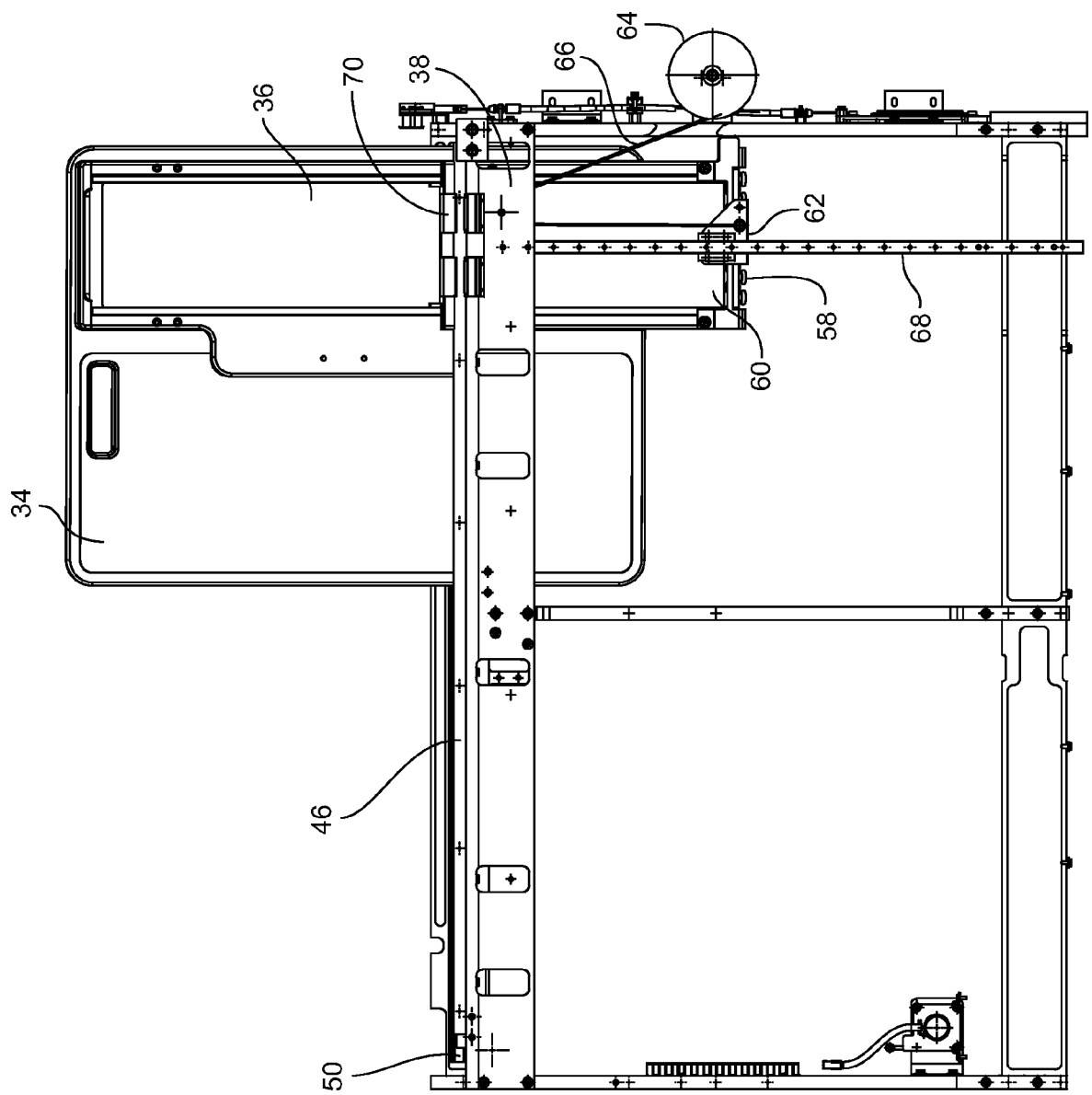
FIG. 6 is a side elevation view of the tray table frame and the tray table partially deployed.
Figure 7:
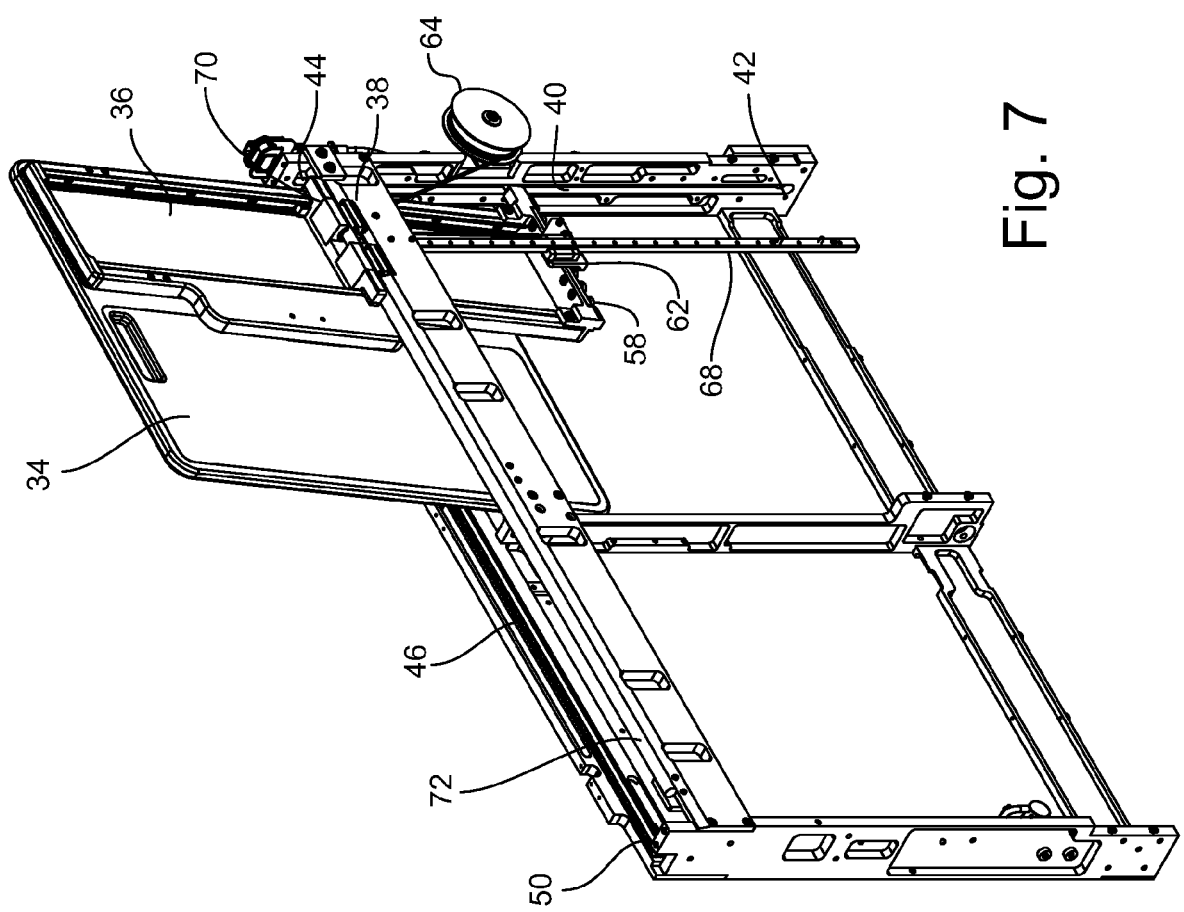
FIG. 7 is a perspective view of the tray table frame and the tray table partially deployed.
Figure 8:
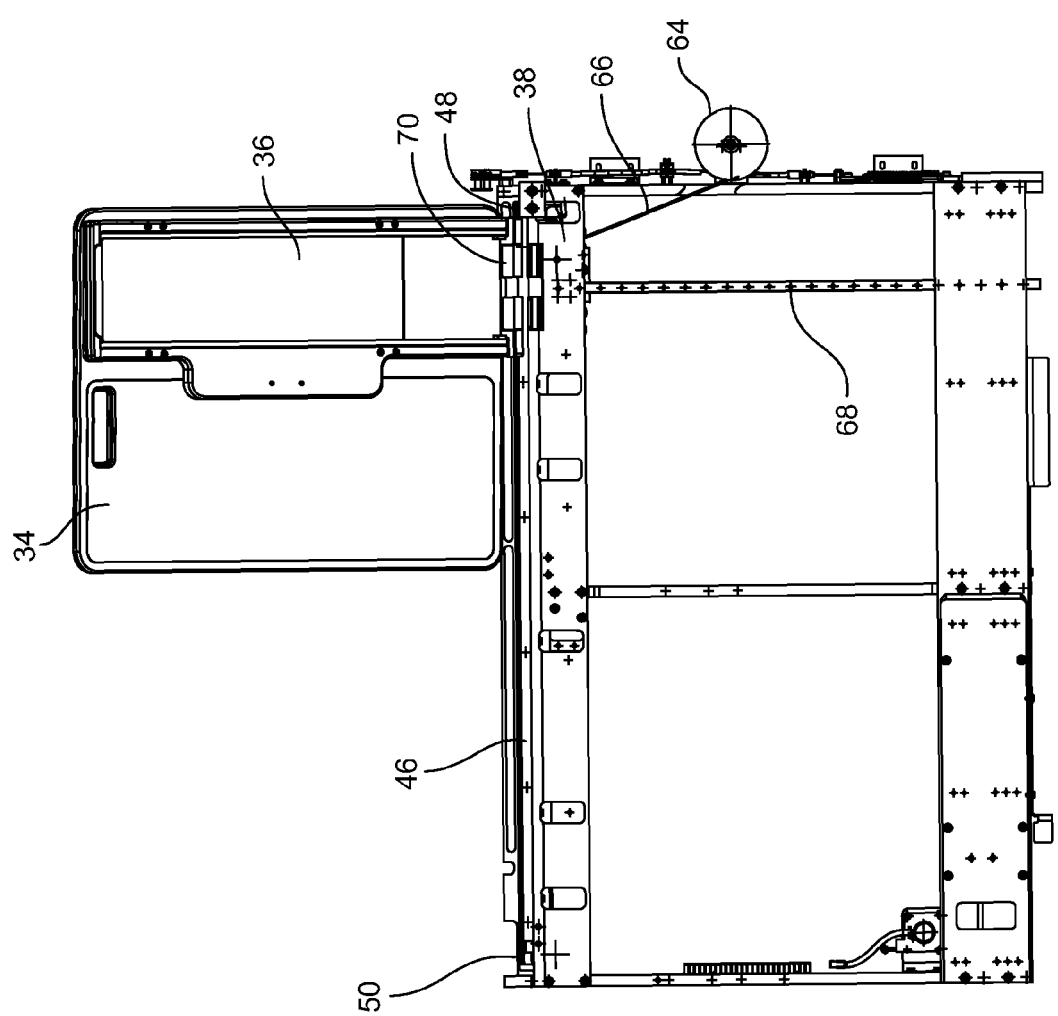
FIG. 8 is a side elevation view of the tray table frame and the tray table partially deployed and separated from the lift bracket.
Figure 9:
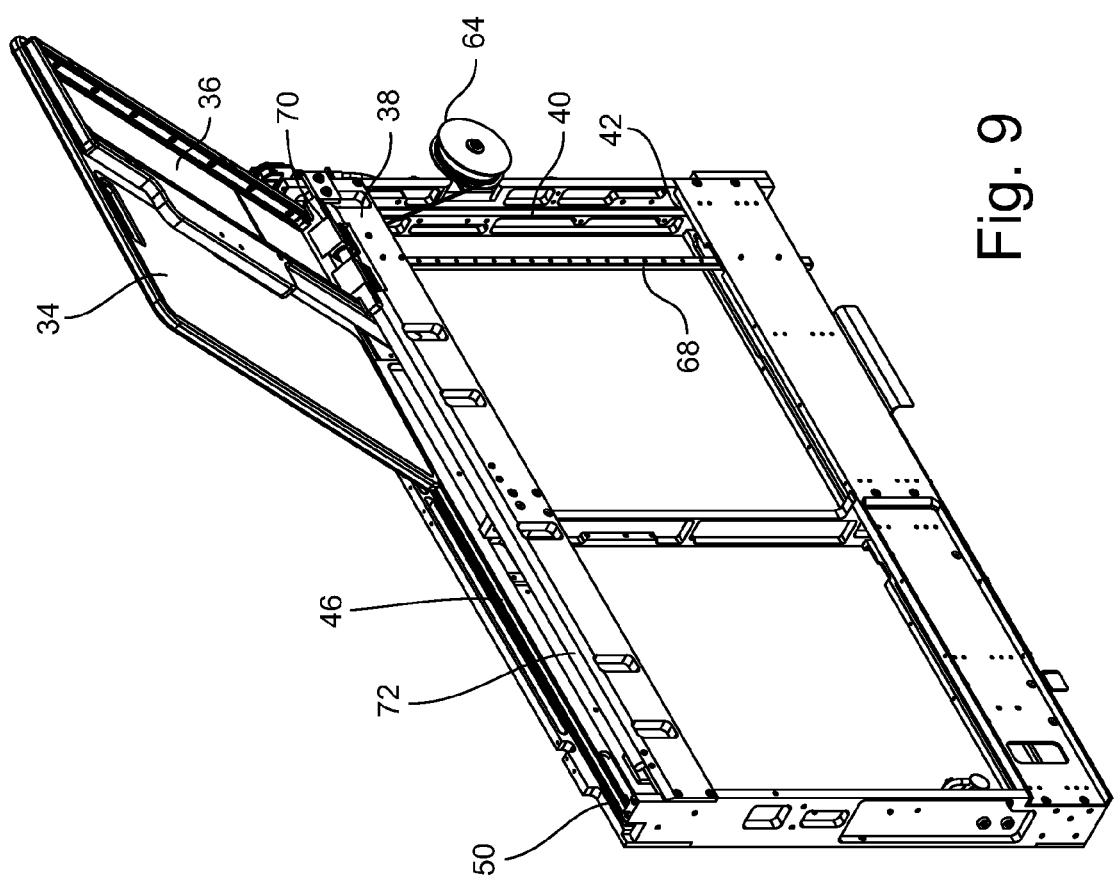
FIG. 9 is a perspective view of the tray table frame and the tray table partially deployed and separated from the lift bracket.
Figure 10:
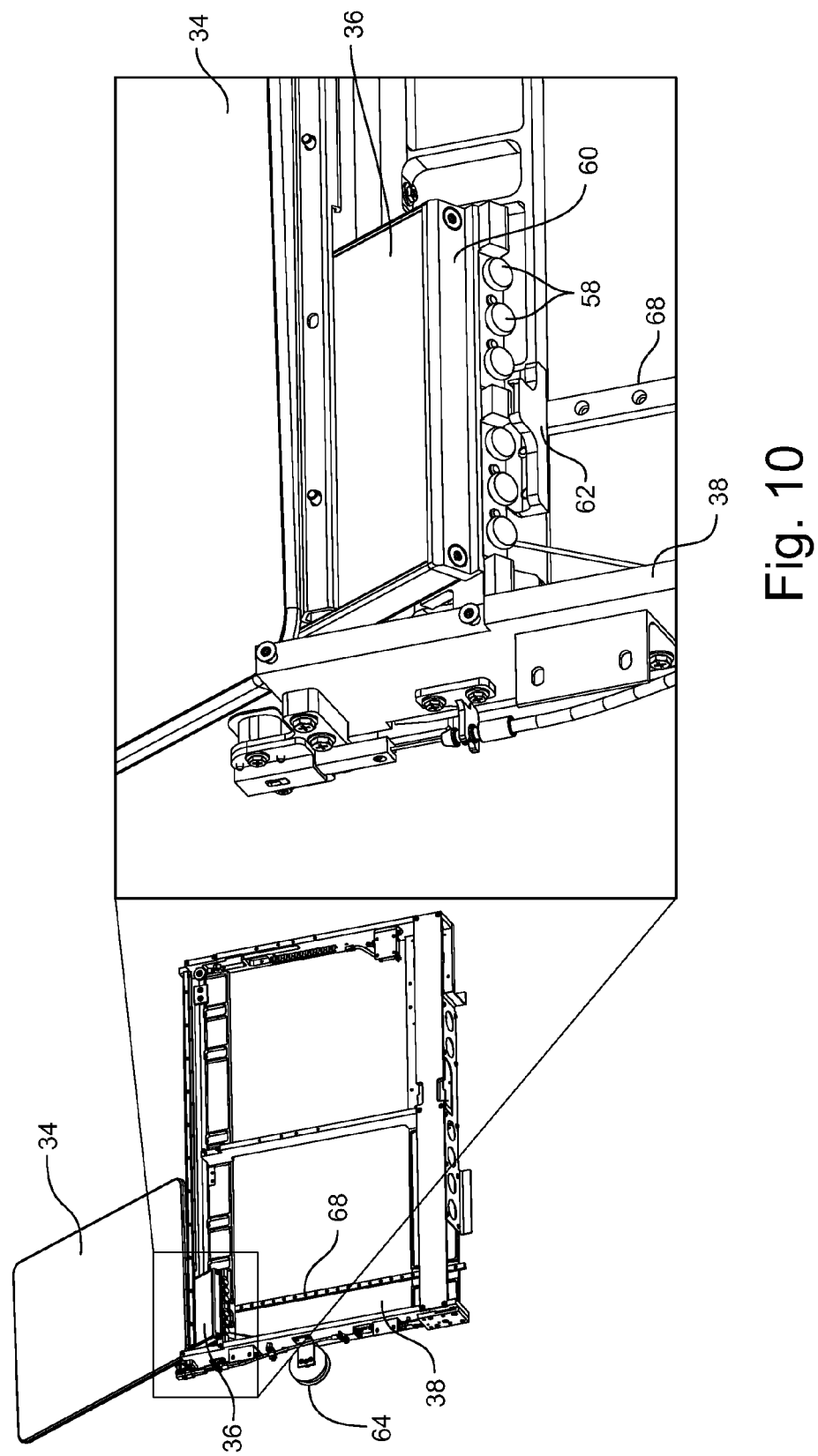
FIG. 10 is a detailed view of the tray table at the top of its travel and disengaged from the lift bracket.
Figure 11:
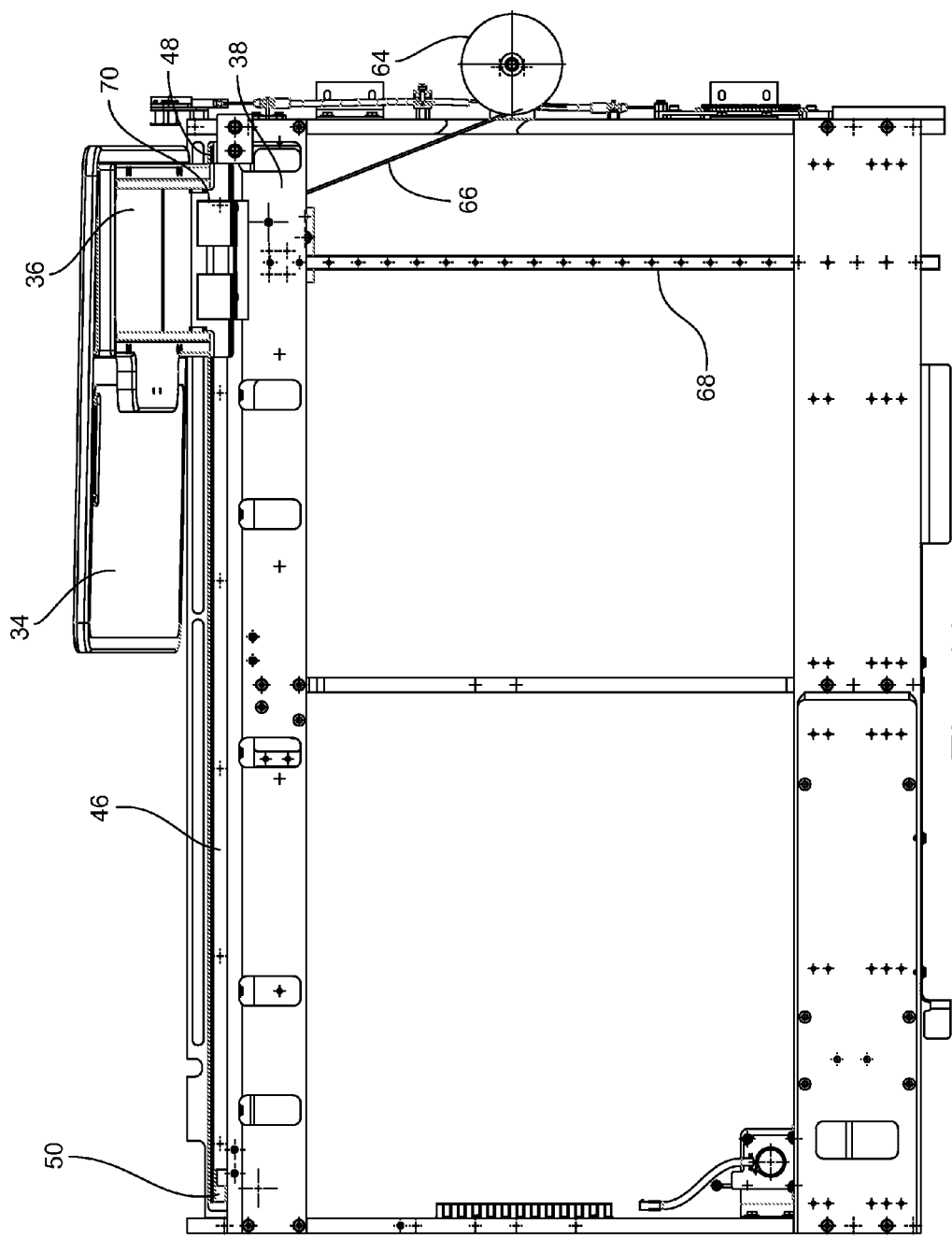
FIG. 11 is a side elevation view of the tray table frame and the tray table partially deployed and almost engaged with the horizontal guide rail of the frame.
Figure 12:
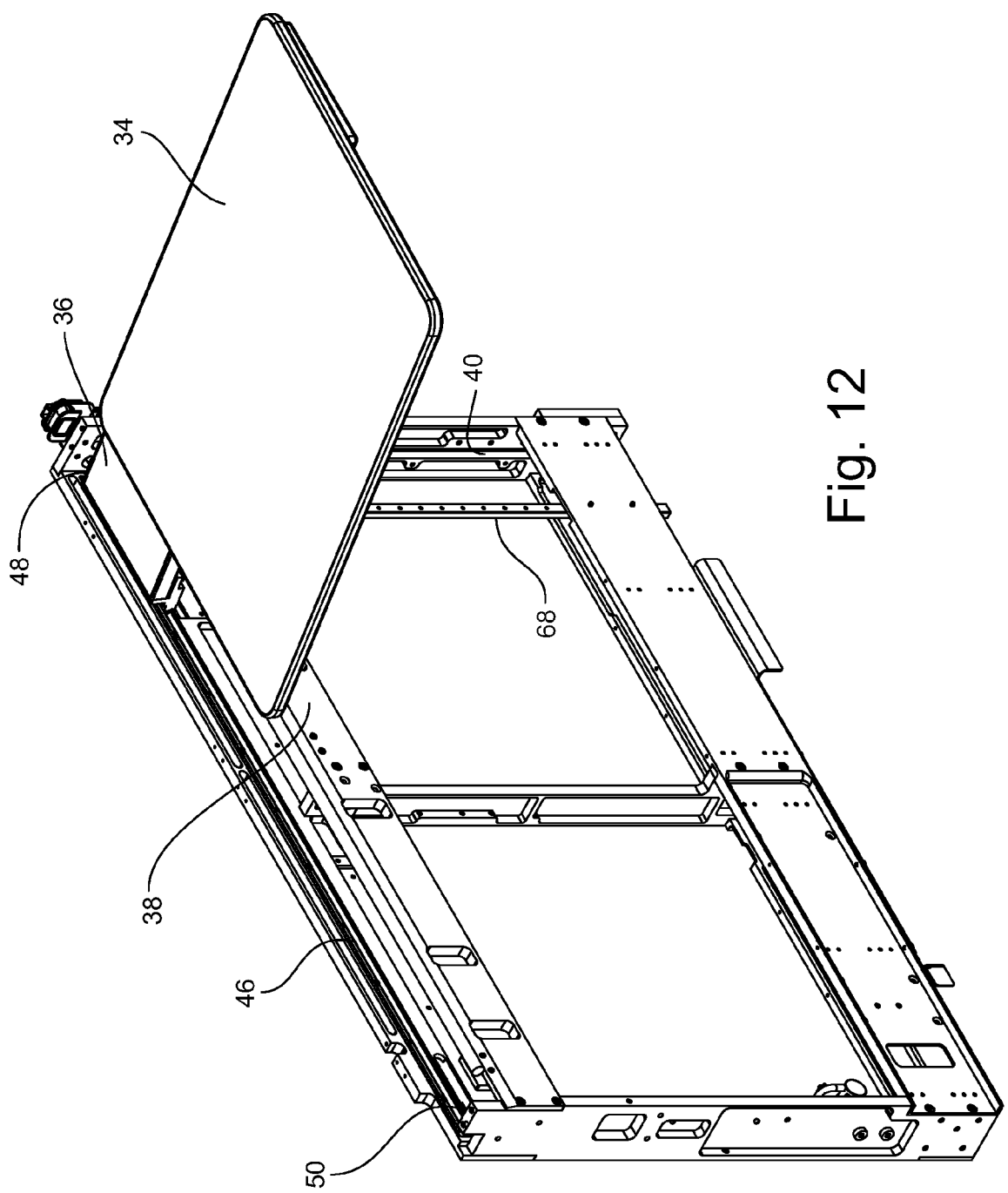
FIG. 12 is a perspective view of the tray table frame and the tray table partially deployed and almost engaged with the horizontal guide rail of the frame.
Figure 13:
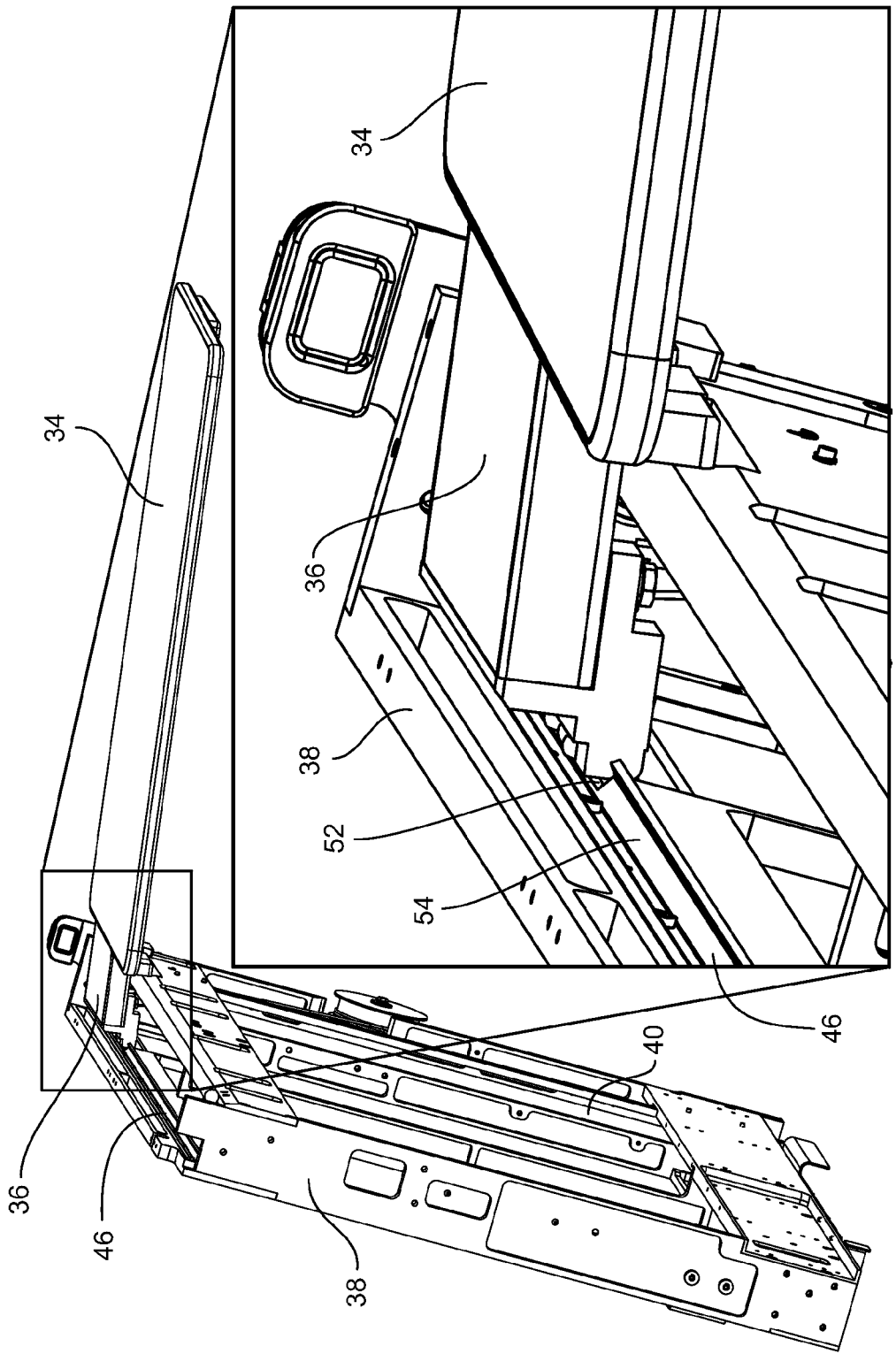
FIG. 13 is a detailed view of the rollers at the rear of the table arm assembly almost engaged with the horizontal guide rail of the frame.
Figure 14:
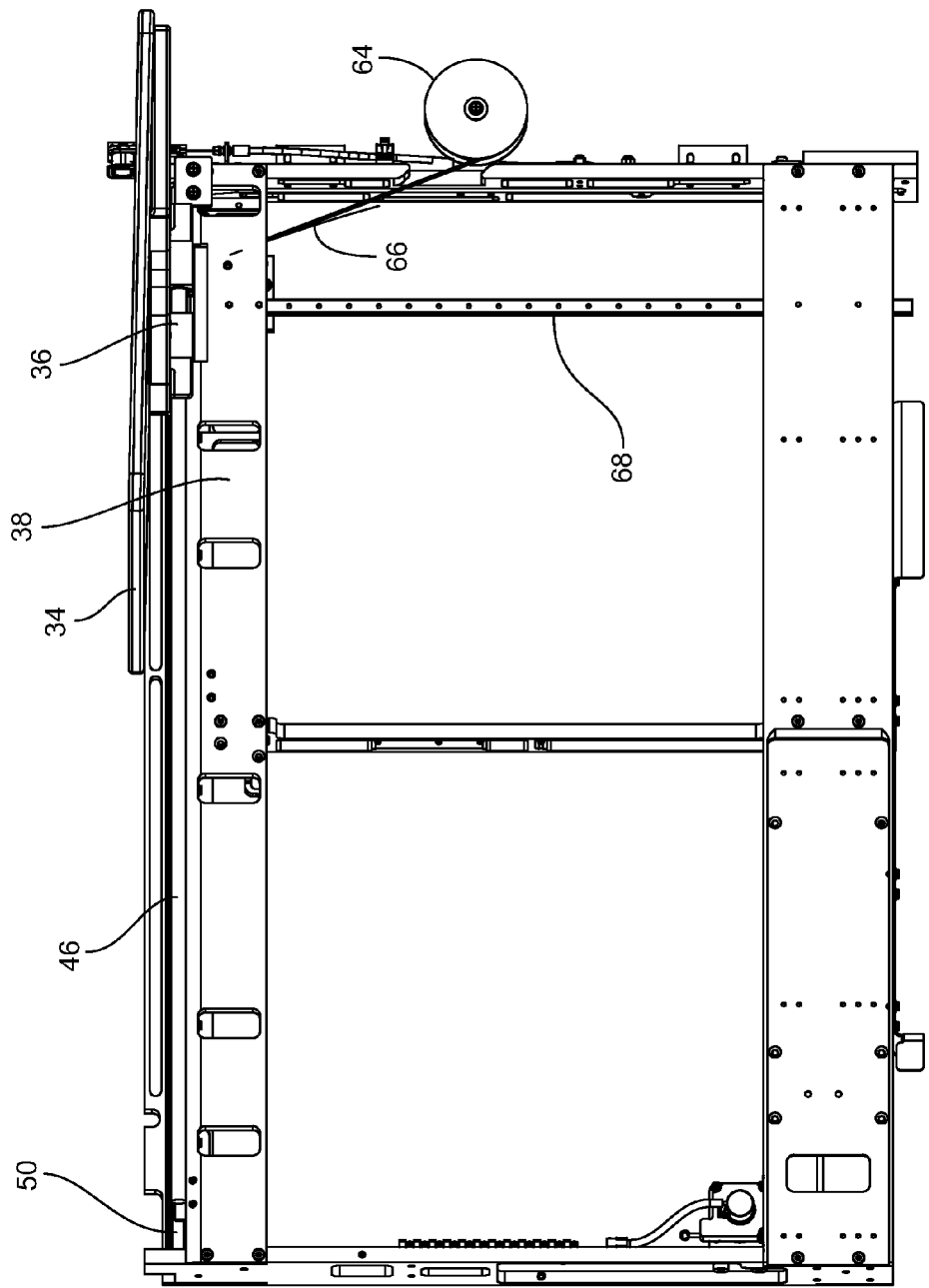
FIG. 14 is a side elevation view of the tray table frame and the tray table deployed.
Figure 15:
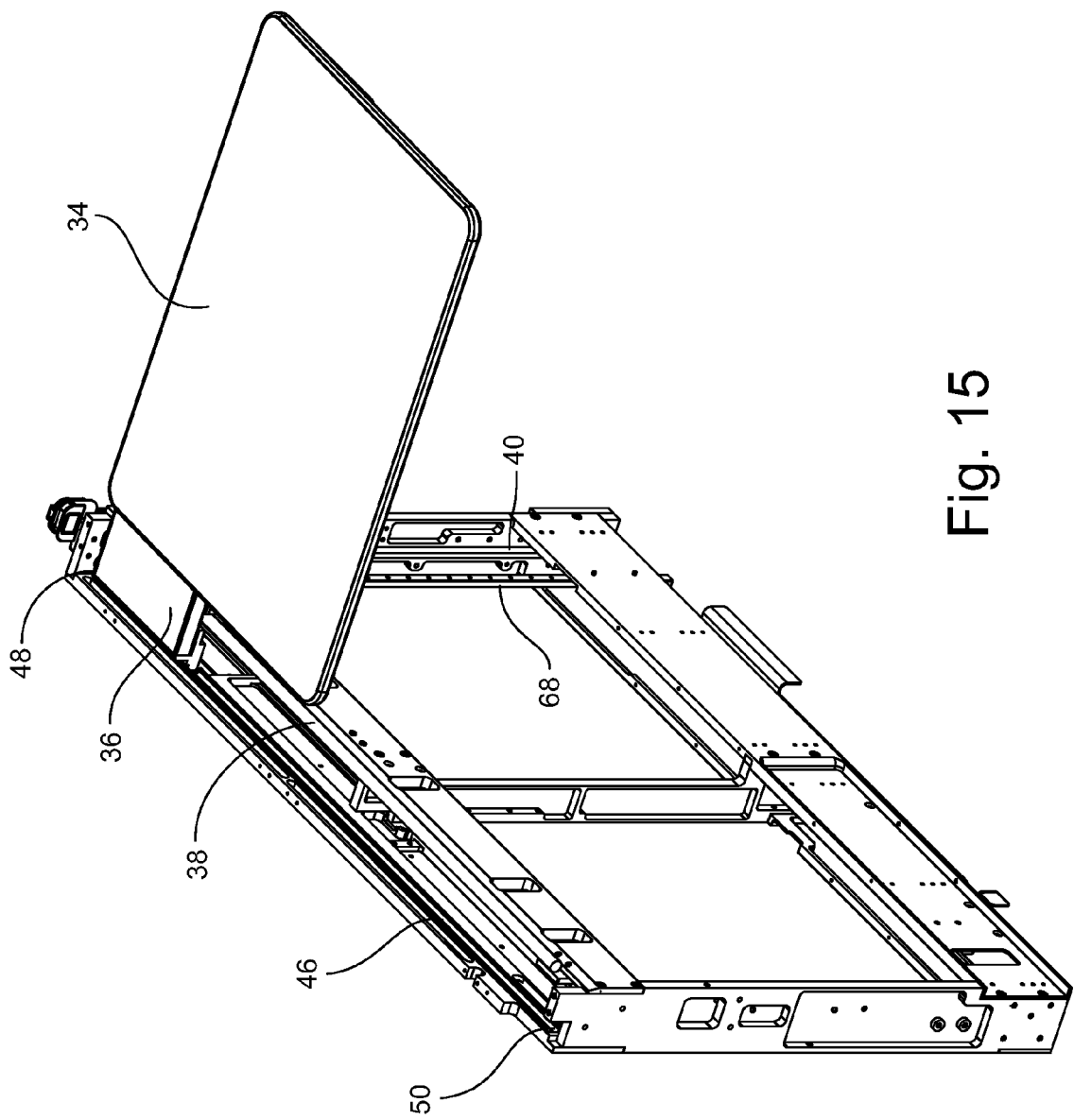
FIG. 15 is a perspective view of the tray table frame and the tray table deployed.
Figure 16:
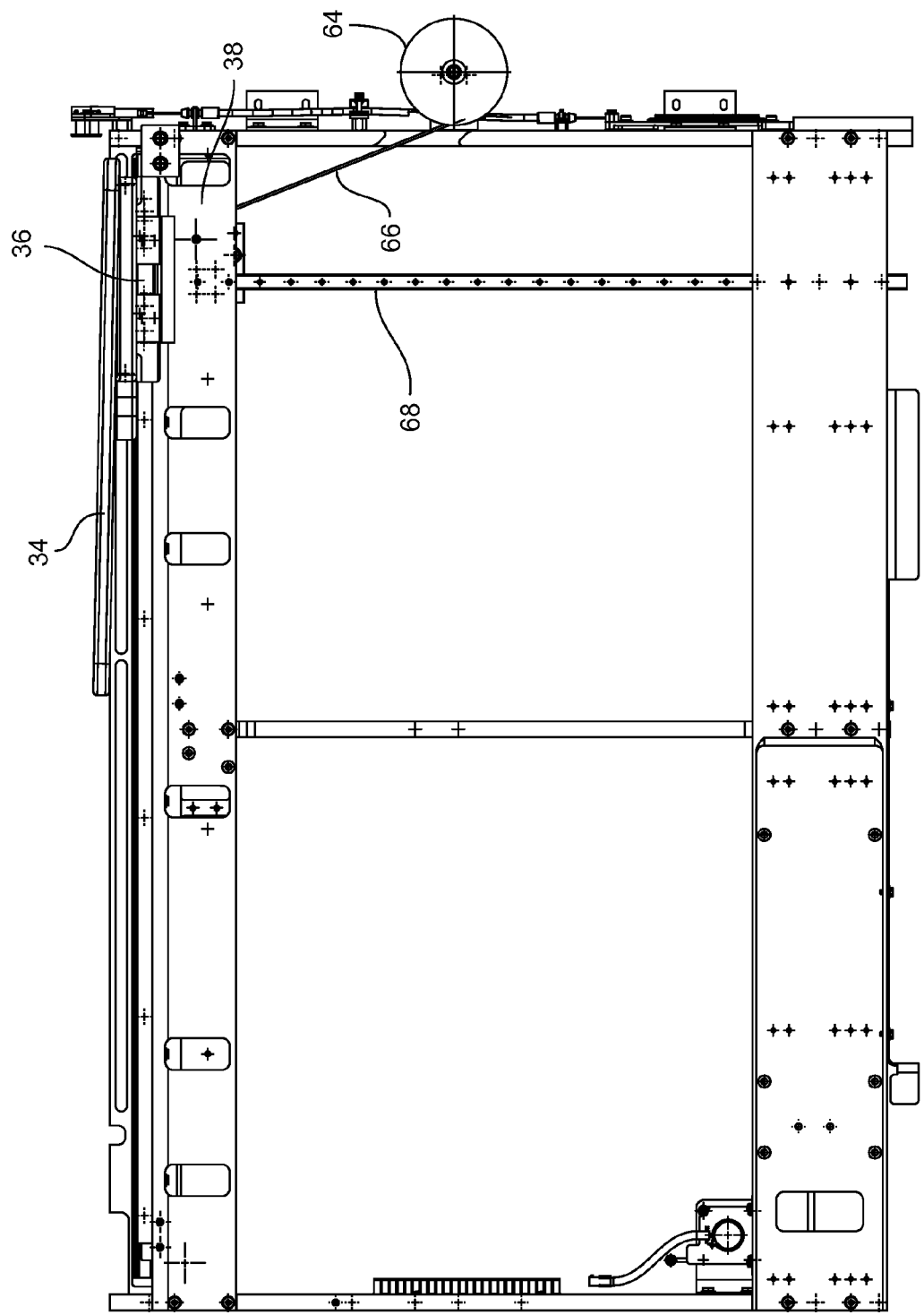
FIG. 16 is a side elevation view of the tray table frame and the tray table deployed and extended.

Referring to FIGS. 4-15, various stages of deployment of tray table assembly 20 are shown. Specifically, FIGS. 4-5 show tray table assembly 20 stowed, FIGS. 6-7 show tray table assembly 20 partially deployed, FIGS. 8-10 show tray table assembly 20 more than halfway deployed, FIGS. 11-13 show tray table assembly 20 nearly fully deployed, and FIGS. 14-15 show tray table assembly 20 fully deployed and in the fully forward position.

Tray table assembly 20 generally includes tray table 34 supported on its underside by arm assembly 36 guided along frame 38. Tray table 34 is a generally thin rectangular body defining a flat working surface, although alternative shapes and surfaces including integrated cup holders are envisioned. Arm assembly 36 stably supports tray table 34 from beneath and adjustably carries tray table 34 through its vertical and horizontal positions. As shown, frame 38 is generally an open-faced rectangular housing defining an interior space for housing tray table 34 and arm assembly 36 in the stowed configurations. Frame 38 may be simplified in construction from that shown to minimally include vertical and horizontal guide rails.

Frame 38 includes vertical guide rail 40 and horizontal guide rail 46 that are separately or 'consecutively' engaged to guide movement of arm assembly 36 when in vertical and horizontal positions, respectively. Vertical guide rail 40 is substantially linear, elongate and terminates in first end 42 positioned apart from horizontal guide rail 46 and second end 44 positioned adjacent to horizontal guide rail 46. Horizontal guide rail 46 is linear, elongate and terminates in first end 48 positioned adjacent to vertical guide rail 40 and second end 50 positioned apart from vertical guide rail 40. Proximate its second end, vertical guide rail 40 defines a bend in the direction inward to frame 38 to guide arm assembly 36 from vertical guide rail 40 to horizontal guide rail 46.

With this frame configuration, arm assembly 36 travels along vertical guide rail 40 followed by, but not concurrent with, travel along horizontal guide rail 46 when tray table 34 is moved from the stowed to deployed positions. Arm assembly 36 travels along only horizontal guide rail 46 when in the horizontal position to provide fore and aft sliding movement. Entry into and exit from vertical guide rail 40 is achieved at second end 44 of vertical guide rail 40. Entry into horizontal guide rail 46 is achieved through notch 52 (see FIG. 13) which allows arm assembly 36 to clear supporting track 54 of horizontal guide rail 46 when arm assembly 36 is positioned adjacent first end 48 of horizontal guide rail 46, i.e. vertically above vertical guide rail 40.

Under this guide rail arrangement, tray table 34 can only be moved to its vertical position when arm assembly 36 is positioned adjacent first end 48 and in alignment with notch 52

(i.e. 'fully forward'), and arm assembly 36 is disengaged from vertical guide rail 40 when engaged with horizontal guide rail 46 and vice versa. This permits arm assembly 36 to only be translated in the aft direction after tray table 34 has been deployed to its fully horizontal position, and tray table 34 cannot be lifted when in an aft position due to the engagement of arm assembly 36 within horizontal guide rail 46.

Figure 19:
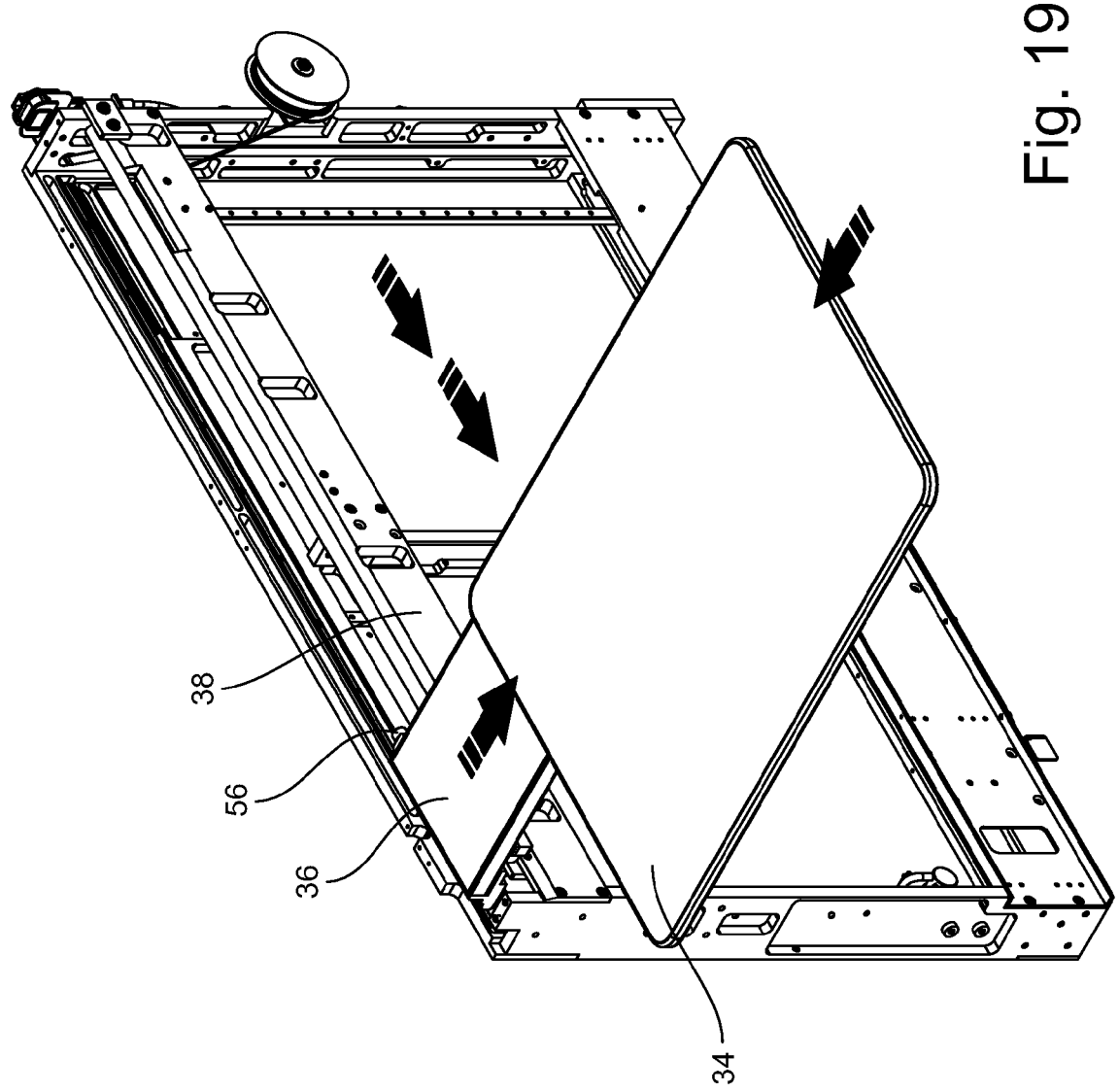
FIG. 19 is a perspective view of the tray table frame and the tray table deployed, extended and slid horizontally, further illustrating the possible movement directions of the tray table.

As best shown in FIGS. 10 and 19, arm assembly 36 rotatably carries on its guided end 60 roller 56 that travels along vertical guide rail 40 when engaged therewith, and at least one, and preferably a plurality of rollers 58 that travel along horizontal guide rail 46 when engaged therewith. Roller 56 defines a rotational axis oriented perpendicular to rotational axes defined by rollers 58. Thus, roller 56 is disengaged from vertical guide rail 40 when rollers 58 are engaged with horizontal guide rail 46, and vice versa. When engaged with horizontal guide rail 46, rollers 58 roll on track 54 to facilitate smooth fore and aft translation.

Tray table assembly 20 further includes lift bracket 62 that engages guided end 60 of arm assembly 20 to aid in vertically lifting tray table 34 and arm assembly 36 from within frame 38. Lift bracket 62 is interconnected to cable-maintaining, tensioned reel 64 through tensioned cable 66 having sufficient tension to cause tray table 34 to rise from frame 38 when unlatched. Lift bracket 62, in cooperation with cable 66 and reel 64, provides a lifting force to sufficiently counterbalance the combined weight of tray table 34 and arm assembly 36 to make tray table 34 seemingly weightless.

As shown, reel 64 is rotatably carried on frame 38, although other mounting locations such as apart from frame 38 are envisioned. Cable 66 is guided over a pulley rotatably carried on frame 38. Lift bracket 62 slides vertically along vertical frame member 68 of frame 38 and disengages from arm assembly 36 when lift bracket 62 reaches the top of its travel along frame member 68, thus freeing arm assembly 36 for subsequent rotation to horizontal.

Tray table assembly 20 further includes carriage 70 slidably carried on bar 72 oriented generally parallel with horizontal guide rail 46. Carriage 70 engages the underside of arm assembly 36 when arm assembly 36 is in its horizontal position, thus consequentially further supporting tray table 34 in the horizontal position. Bar 72 and guided carriage 70 are positioned spaced apart from the point of engagement of arm assembly 36 with horizontal guide rail 46 to prevent the rotation of arm assembly 36. Bar 72 has a length generally corresponding to the length of horizontal guide rail 46 to provide an equal length of travel of arm assembly 36 along both components. Carriage 70 defines at least one planar supporting surface 74 for engaging the underside of arm assembly 36.

Figure 17:
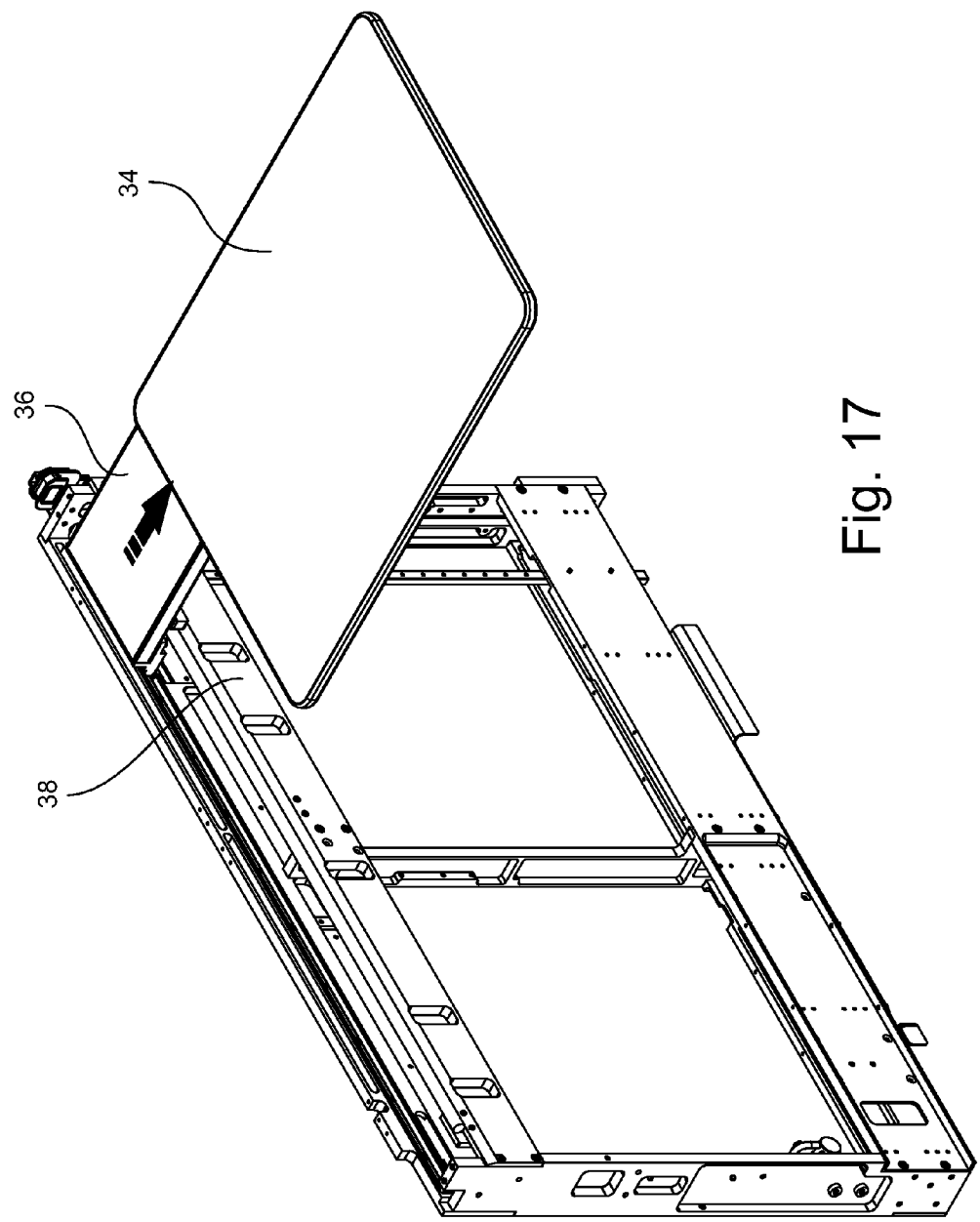
FIG. 17 is a perspective view of the tray table frame and the tray table deployed extended.
Figure 18:
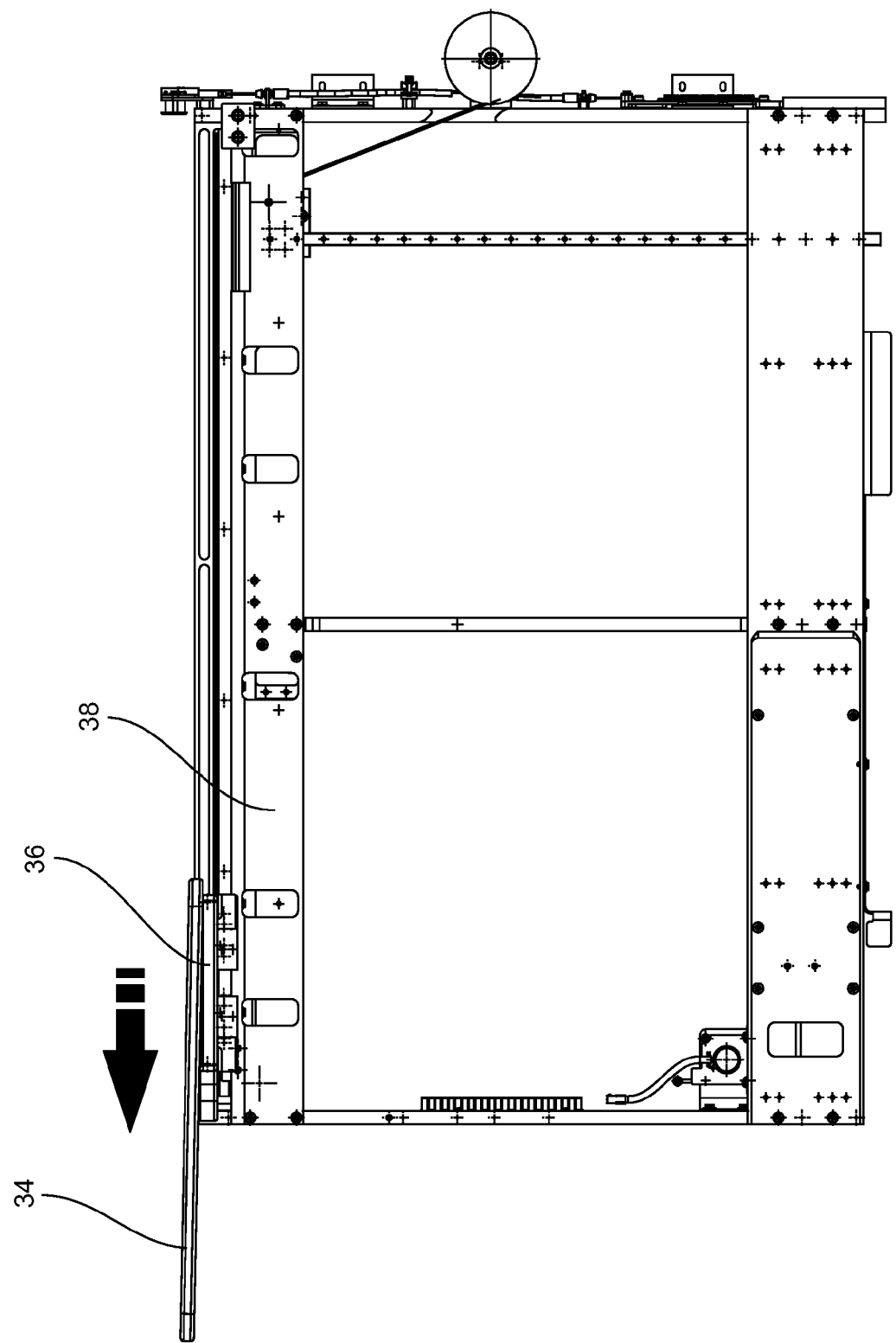
FIG. 18 is a side elevation view of the tray table frame and the tray table deployed, extended and slid horizontally.

Referring to FIGS. 16-19, when deployed, tray table 36 is configured to move relative to underlying arm assembly 36 in a direction away from frame 38 in order to 'extend' tray table 34. Potential movement of tray table 34 is indicated by the directional arrows, and is achieved by controlled sliding engagement of tray table 34 with arm assembly 36. Movement of tray table 34 in the direction away from frame 38 is limited by a mechanical stop to prevent unintentional removal of tray table 34 from arm assembly 36. Referring specifically to FIG. 17, tray table 34 is shown deployed and extended. Referring specifically to FIGS. 18-19, tray table 34 is shown deployed, extended, and slid horizontally in the direction of its respective seat, with the potential to be lid back in the direction of frame 38.

Tray table assembly 20 may further include any type of conventional releasing latch that moves out of engagement to release the assembly for withdrawal. A cover 76 may also be provided and attached to either console 30 or frame 38 that opens to access the stowed tray table. Cover 76 is preferably hingedly attached to prevent its separation from console 30 or frame 38.

While a stowable tray table assembly has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A stowable tray table assembly, comprising:
a tray table;
an arm assembly supporting the tray table;
a frame comprising a vertical guide rail and a horizontal guide rail separately and consecutively guiding movement of the arm assembly, the arm assembly engaging the vertical guide rail when the tray table is in a vertical position and engaging the horizontal guide rail when the tray table is in a horizontal position; and
a lift bracket vertically slidable along the frame and engaging the arm assembly when the arm assembly is engaged with the vertical guide rail, wherein the vertical guide rail defines a first end positioned apart from the horizontal guide rail and a second end positioned adjacent to the horizontal guide rail, and wherein the arm assembly is disengaged from the lift bracket when the arm assembly is positioned at the second end of the vertical guide rail.

2. The tray table assembly according to claim 1, further comprising a cover attached to the frame that opens to provide access to an interior of the frame to access the tray table when the tray table is in a stowed configuration.

3. The tray table assembly according to claim 1, further comprising a rotatable reel tensioning a cable connected to the lift bracket for providing a lifting force to the lift bracket to counterbalance the weight of the tray table.

4. The tray table assembly according to claim 1, further comprising a carriage slidably carried on a bar oriented parallel to the horizontal guide rail, wherein the carriage supports the arm assembly when the tray table is in the horizontal position.

5. The tray table assembly according to claim 1, wherein the tray table is movable relative to the arm assembly in a direction away from the frame when the tray table is in the horizontal position.

6. The tray table assembly according to claim 1, wherein the horizontal guide rail is oriented perpendicular to the vertical guide rail.

7. The tray table assembly according to claim 1, wherein the horizontal guide rail defines a first end positioned adjacent to the vertical guide rail and a second end positioned apart from the vertical guide rail, and wherein the tray table can only be moved to the vertical position when the arm assembly is positioned at the first end of the horizontal guide rail.

8. The tray table assembly according to claim 7, wherein the horizontal guide rail defines a notch for clearing the arm assembly when the arm assembly is positioned at the first end of the horizontal guide rail.

9. The tray table assembly according to claim 1, wherein the arm assembly comprises a first roller for engaging the vertical guide rail, and at least one second roller for engaging the horizontal guide rail, wherein the first roller defines a rotational axis perpendicular to a rotational axis defined by the at least one second roller.

10. The tray table assembly according to claim 9, wherein the first roller and the at least one second roller are rotatably carried on a guided end of the arm assembly.

11. A passenger seating arrangement, comprising:
a passenger seat; and
a tray table assembly comprising:
   a tray table;
   an arm assembly supporting the tray table;
   a frame positioned alongside the passenger seat, the frame comprising a vertical guide rail and a horizontal guide rail separately guiding movement of the arm assembly, and the arm assembly engaging the vertical guide rail when the tray table is in a vertical position and engaging the horizontal guide rail when the tray table is in a horizontal position; and
   a first roller of the arm assembly engaging the vertical guide rail and at least one second roller of the arm assembly engaging the horizontal guide rail, wherein the first roller defines a rotational axis perpendicular to a rotational axis defined by the at least one second roller.

12. The passenger seating arrangement according to claim 11, wherein the tray table is movable relative to the arm assembly in a direction away from the frame when the tray table is in the horizontal position.

13. The passenger seating arrangement according to claim 11, further comprising a cover attached to the frame that opens to provide access to an interior of the frame to access the tray table when the tray table is in a stowed configuration.

14. The passenger seating arrangement according to claim 11, wherein the tray table assembly further comprises a lift bracket vertically slidable along the frame and engaging the arm assembly when the arm assembly is engaged with the vertical guide rail to apply a lifting force to the arm assembly, and a rotatable reel associated with the frame tensioning a cable connected to the lift bracket for providing a lifting force to the lifting bracket to counterbalance the weight of the tray table.

15. The passenger seating arrangement according to claim 11, wherein the vertical guide rail defines a first end positioned apart from the horizontal guide rail and a second end positioned adjacent to the horizontal guide rail, and wherein the arm assembly is disengaged from a lift bracket when the arm assembly is positioned at the second end of the vertical guide rail.

16. The passenger seating arrangement according to claim 11, wherein the horizontal guide rail defines a first end positioned adjacent to the vertical guide rail and a second end positioned apart from the vertical guide rail, wherein the tray table can only be moved to the vertical position when the arm assembly is positioned at the first end of the horizontal guide rail.

17. The passenger seating arrangement according to claim 11, wherein the tray table assembly further comprises a carriage slidably carried on a bar positioned parallel to the horizontal guide rail, wherein the carriage supports the arm assembly when the tray table is in the horizontal position.

* * * * *